United States Patent [19]

Tsuneishi et al.

[11] Patent Number: 4,892,572
[45] Date of Patent: Jan. 9, 1990

[54] OPTICAL FIBER DRAWING APPARATUS

[75] Inventors: Katsuyuki Tsuneishi; Shigeru Ito; Takashi Yamazaki, all of Yokohama, Japan

[73] Assignee: Sumitomo Electric Industries, Ltd., Osaka, Japan

[21] Appl. No.: 274,855

[22] Filed: Nov. 22, 1988

[30] Foreign Application Priority Data

Nov. 24, 1987 [JP] Japan .............................. 62-177609[U]

[51] Int. Cl.$^4$ .............................................. C03B 37/25
[52] U.S. Cl. ...................................... 65/10.1; 19/0.26; 65/13; 242/37 R; 425/66
[58] Field of Search ................. 65/1, 2, 10.1, 11.1, 65/13, 375; 425/66; 19/0.2, 0.26; 242/18 G, 28, 29, 36, 37 R, 49, 147 A

[56] References Cited

U.S. PATENT DOCUMENTS

| | | | |
|---|---|---|---|
| 2,976,580 | 3/1961 | Riedel | 65/13 |
| 3,912,479 | 10/1975 | Roberson | 65/11.1 |
| 4,025,026 | 5/1977 | Merritt et al. | 242/147 A |
| 4,331,463 | 5/1982 | Briere et al. | 65/13 |

*Primary Examiner*—Joye L. Woodard
*Attorney, Agent, or Firm*—Cushman, Darby & Cushman

[57] ABSTRACT

An optical fiber drawing apparatus which includes a heating furnace which fuses a forward end of an optical fiber preform for drawing an optical fiber, and a screening portion which applies tension to the optical fiber through in-line, for guarantee of its strength. The screening portion further includes a suction device disposed along a passage of the optical fiber running through it for sucking in the optical fiber.

1 Claim, 2 Drawing Sheets

OPTICAL FIBER DRAWING APPARATUS

BACKGROUND OF THE INVENTION

The present invention generally relates to a drawing arrangement, and more particularly, to a drawing apparatus for drawing an optical fiber in the manufacture thereof.

The optical fiber normally has a tensile strength of several hundred kg/mm$^2$ (breaking elongation at several%), and in the longitudinal direction of the optical fiber, it is necessary to remove portions having low strength below 70 Kg/mm$^2$ (breaking elongation at 1%). For this purpose, it has been a conventional practice to effect screening for strength guarantee by applying a constant tension over an entire length of the optical fiber so as to break the low strength portions thereof for removal. In many cases, such screening process is generally incorporated, through in-line, in the optical fiber drawing apparatus arranged to fuse an optical fiber preform by heating for drawing the optical fiber.

In a conventional optical fiber drawing apparatus as shown in FIG. 3, it is so arranged that an optical fiber preform 1 lowered at a constant speed by a feeding device 2 has its lower end fused through heating by a heating furnace 3 so as to be drawing into an optical fiber 10, and thereafter, the optical fiber thus formed is coated with resin by a coating device 4, with subsequent curing of the resin by a curing furnace 5, and then, taken up onto a capstan 6. The optical fiber is further passed through a screening portion 7, and subsequently, wound onto a winding machine 8 as a finished optical fiber 10.

In the known optical fiber drawing apparatus as described above, however, there has been such a disadvantage that when the optical fiber is broken at its low strength portion in the screening portion 7, the portion of the optical fiber 10 continuously drawing out by the capstan 6 gets entangled with the capstan 6, thus requiring a great deal of time for restoring its normal running passage, with a consequent loss in the productivity of the optical fiber.

SUMMARY OF THE INVENTION

Accordingly, an essential object of the present invention is to provide an optical fiber drawing apparatus, having an improved screening portion free from entanglement of a broken optical fiber with respect to other surrounding devices.

Another object of the present invention is to provide an optical fiber drawing apparatus of the above described type, which is simple in construction and stable in functioning with high reliability.

In accomplishing these and other objects, according to one preferred embodiment of the present invention, there is provided an optical fiber drawing apparatus which includes a heating furnace which fuses a forward end of an optical fiber preform for drawing an optical fiber therefrom, and a screening portion which applies tension to the optical fiber through in-line to for guarantee strength thereof. The screening portion further includes a suction device disposed along a passage of the optical fiber running therethrough for sucking in the optical fiber thereinto.

By the above arrangement according to the present invention, when the low strength portion of the optical fiber is broken at the screening portion, the optical fiber to be continuously paid out subsequently is advantageously sucked into the suction device without being entangled with other devices.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
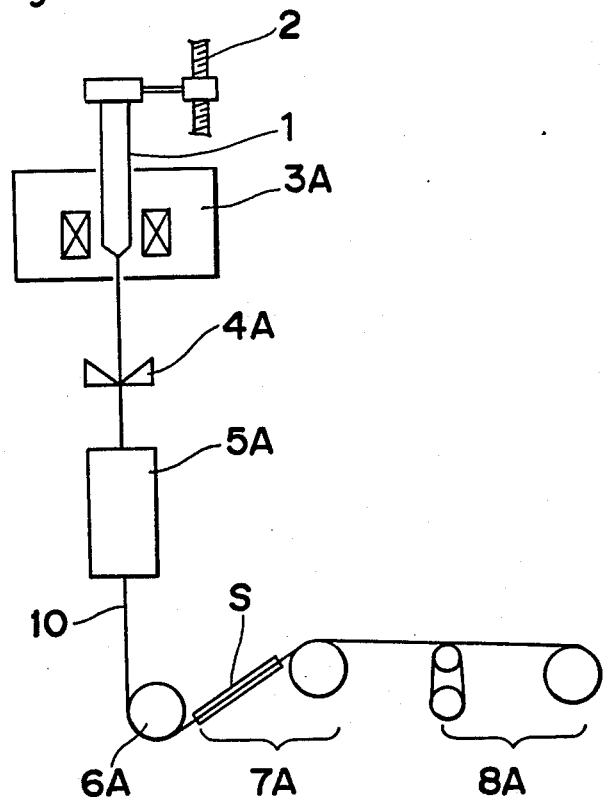
FIG. 1 is a schematic diagram showing construction of an optical fiber drawing apparatus according to one preferred embodiment of the present invention.

Before the description of the present invention proceeds, it is to be noted that like parts are designated by like reference numerals throughout the accompanying drawings.

Figure 2:
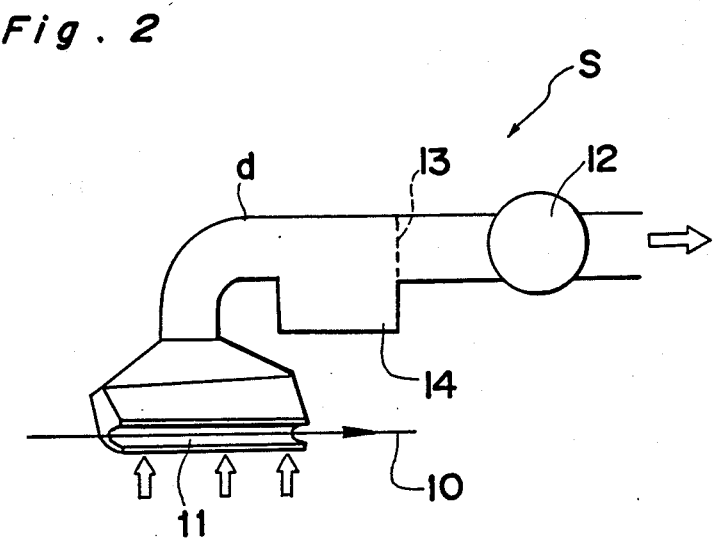
FIG. 2 is a schematic diagram showing on an enlarged scale, construction of a suction device employed in the apparatus of FIG. 1.

Referring now to the drawings, there is shown in FIGS. 1 and 2, an optical fiber drawing apparatus according to one preferred embodiment of the present invention, which generally includes a heating furnace 3A for fusing the forward end of the optical fiber preform 1 lowered by a feeding device 2 at a constant speed so as to be drawn into an optical fiber 10, a coating device 4A for coating the optical fiber thus drawn with resin, a curing furnace 5A for curing the resin applied onto the optical fiber 10, a capstan 6A for taking-up the optical fiber thus processed, a screening portion 7A particularly provided with a suction device S, and a winding machine 8A for winding the finished optical fiber 10 thereonto.

As shown on an enlarged scale in FIG. 2, the above suction device S directly related to the present invention includes suction port 11 provided along a passage of the optical fiber 10, a suction blower 12 connected to said suction port 11 through a pipe d, and a mesh element 13 provided in the pipe d between the suction port 11 and the suction blower 12, with a recess or pocket 14 being formed within said pipe d in a position before said mesh element 13 as illustrated.

Accordingly, when the optical fiber 10 is broken off, at its low strength portion in the screening portion 7A, it is sucked in through the suction port 11. The fiber is prevented from entering further by the mesh element 13 located before the blower 12 so that the fiber accumulates in the pocket 14 provided prior to said mesh element 13.

It is to be noted here that, although the suction blower 12 may be operated at all times during drawing of the optical fiber, it may be so arranged as to be operated at any time through detection of rupture of the optical fiber 10 at the screening portion 7A, for example, by variation of a position of a dancer roller (not shown) for the winding machine 8A.

According to an experiment carried out by the present inventors, when an optical fiber was drawn by the drawing apparatus having the construction as described so above, the optical fiber 10 was broken 10 times at the screening portion 7A. The length of the optical fiber required for restoring the running line of the optical fiber 10 was about 100m on the average.

Figure 3:
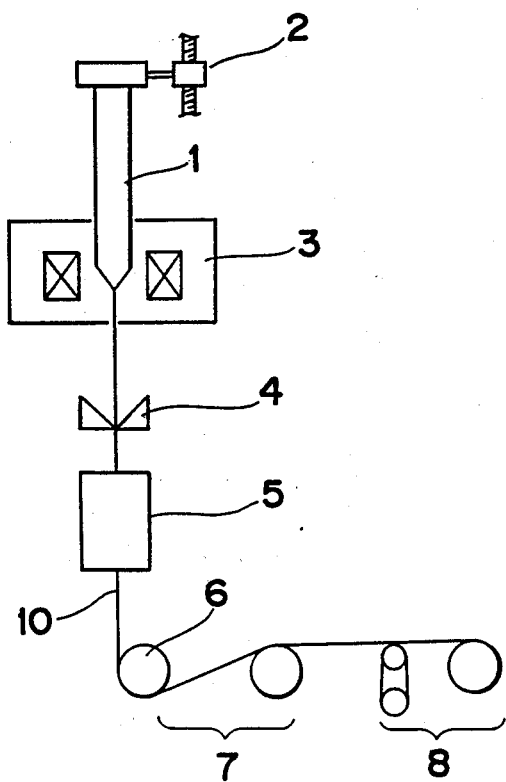
FIG. 3 is a diagram similar to FIG. 1, which particularly shows a conventional optical fiber drawing apparatus.

Meanwhile, as a comparative example, in the case where an optical fiber was drawn through employment of the conventional drawing apparatus as described earlier with reference to FIG. 3, the optical fiber broke at the screening portion 7 undesirably twisted around the capstan 6, and for restoring the running line of the optical fiber, the length in the optical fiber in about 1000m was required on average, with breakage occurring 12 times.

As is clear from the foregoing description, according to the optical fiber drawing apparatus of the present invention, since the suction device provided at the screening portion sucks in the broken optical fiber, there is no possibility that such broken optical fiber can become twisted around other devices of the apparatus, and thus, the restoration of the running line of the optical fiber is simplified, thereby making it possible to improve the productivity of the optical fiber.

Although the present invention has been fully described by way of example with reference to the accompanying drawings, it is to be noted here that various changes and modifications will be apparent to those skilled in the art. Thererfore, unless otherwise such changes and modifications depart from the scope of the present invention, they should be construed as included therein.

What is claimed is:

1. An optical fiber drawing apparatus which comprises a heating furnace which fuses a forward end of an optical fiber preform for drawing an optical fiber therefrom, and a screening portion including means for applying tension to the optical fiber through in-line for guaranteeing strength of the fiber, said screening portion further comprising a suction device disposed along a passage of the optical fiber running therethrough for sucking in said optical fiber at a time of breakage of said optical fiber, said suction device comprising a suction port provided along the passage, a suction blower connected to said suction port through a pipe, and a mesh element provided in the pipe between said suction port and said suction blower with a pocket formed in said pipe in a position prior to the mesh element.

* * * * *